United States Patent [19]

Bradford et al.

[11] Patent Number: 4,671,833

[45] Date of Patent: Jun. 9, 1987

[54] PROCESS FOR APPLYING A HEAT-SHRINKABLE MATERIAL OVER SULFUR WELL PIPING

[75] Inventors: Randol W. Bradford, Waggaman; Alfred E. Hiller, Metairie; Burnham F. Winters, Jr., Thibodaux, all of La.

[73] Assignee: Freeport Minerals Company, New York, N.Y.

[21] Appl. No.: 653,598

[22] Filed: Sep. 24, 1984

[51] Int. Cl.[4] ............................................. B32B 31/26
[52] U.S. Cl. .................................... 156/86; 166/244.1; 166/902; 264/230; 264/342 R; 285/45; 285/53; 285/381; 285/909
[58] Field of Search ................... 156/86, 85; 264/230, 264/342 R; 166/244 R, 244 C; 285/45, 53, 381, DIG. 10

[56] References Cited

U.S. PATENT DOCUMENTS

| 3,297,819 | 1/1967 | Wetmore | 156/86 |
| 3,542,404 | 11/1970 | Henry et al. | 285/381 |
| 4,245,674 | 1/1981 | Nakamura et al. | 156/86 |
| 4,465,309 | 8/1984 | Nimke et al. | 285/381 |

FOREIGN PATENT DOCUMENTS

| 52-16016 | 2/1977 | Japan | 156/86 |
| 1078559 | 8/1967 | United Kingdom | 156/86 |
| 1410769 | 10/1975 | United Kingdom | 285/381 |

*Primary Examiner*—Caleb Weston
*Attorney, Agent, or Firm*—Fisher, Christen & Sabol

[57] ABSTRACT

A process for placing heat-shrinkable polyfluoroolefin polymer sleeves, preferably, FEP resin or PFA resin, over Frasch sulfur well piping and other downhole well piping to protect such piping from corrosion.

A heat chamber for heat-shrinking the polyfluoroolefin polymer sleeves onto the piping.

15 Claims, 9 Drawing Figures

PROCESS FOR APPLYING A HEAT-SHRINKABLE MATERIAL OVER SULFUR WELL PIPING

BACKGROUND OF THE INVENTION

1. Field Of The Invention

The invention relates to downhole equipment as used in the mining of subterranean sulfur deposits, oil and gas field operations and similar operations. More particularly, the invention relates to the protection of the pipes used in such techniques from corrosion.

2. Prior Art

The Frasch process is a method for the mining of a deep-lying sulfur deposit, often found in shallow salt domes. Very hot or "superheated" water is forced into the deposit. The heated water under pressure is pumped down the outer of three concentric pipes. The liquid sulfur, which is very pure, collects in a pool at the bottom of the piping. Compressed air is then forced down the inner pipe forming a froth of the molten sulfur, which is forced up through the middle concentric pipe to the surface. The liquid mixture of sulfur and water is discharged, for example, into bins and the sulfur is allowed to solidify, or into barges or ships for transportation to plants.

In the Frasch process of mining sulfur, the downhole piping of the Frasch process sulfur wells is exposed to highly corrosive mixtures of molten sulfur and superheated (fresh, brine or seawater) water. Hydrogen sulfide and other severe corrodents are also present, these compounds being dissolved in the caprock formation water which is in contact with the sulfur well casing. Due to operating in this corrosive environment, corrosion has always been recognized as a major problem in Frasch sulfur well operation. The corrosion is compounded in "sensitive" or weak sulfur wells. In these wells, the molten sulfur pool at the bottom of the well is so small that the corrosive formation water may be drawn into the interior piping of the sulfur wells. Sulfur well piping can, in weak wells, fail in a matter of days. Depending upon the type of failure and how much downhole equipment can be salvaged after a failure, the cost of a sulfur well failure can be several hundred thousand dollars. This cost does not include lost production while the well is being reworked or replaced.

Many schemes and methods have been tried over the years to combat sulfur well corrosion (primarily with the bottom joint sulfur line) with mixed results. The problem is caused by the extreme temperature and corrosive conditions at the sulfur-water interface. The various corrective or preventive schemes and methods include different coatings, anodic sheaths and basic material changes. Cement linings have been applied around the interior of sulfur lines and have been very successful but the cement lining technique cannot be used on exterior surfaces of the downhole piping. Teflon materials and baked phenolic coatings were found, over the years, to be resistant to sulfur well corrosion; however, such materials had drawbacks that prevented their widespread use. Teflon has physical properties that have made it difficult and uneconomic to apply to downhole equipment. Phenolics are notoriously brittle, and corrosion appears to concentrate in areas where the coating has been removed. Coatings have some peculiar problems. The time required for curing is prohibitive in many cases. Quick curing coatings fail to have adequate resistance to the chemical and/or temperature conditions found downhole. The application of these coatings on the rig often prohibits their use or the quality of the coating is insufficient to meet minimum requirements. When the coatings are applied on the pipe prior to delivery to the rig, they are subject to damage by tongs, rotary pipe slips and other rig tools used to set the pipe.

Carbon steel is the principal material of construction for oil field tubular goods. Such tubings can be obtained in various grades and strengths, however, they are still basically carbon steel and fare very poorly in the downhole environment of sulfur wells. More exotic metals have proven to yield better results, however, such metals also have their problems. The cost of such materials prohibits installation of great quantities in the sulfur wells. When a partial string of these more noble metals is attached to a less noble metal (carbon steel), a corrosion cell is formed and makes the design even less durable than the carbon steel alone. Non-conductive couplings have been developed and tested, however, total isolation of the noble section from the other sulfur well piping is difficult. The final problem with the exotic metals is their availability in tubular form.

To overcome the effect of such corrosion cells, different materials have been used to sheath the more noble metal bottom joints. Such materials are sacrificially corroded to provide protection for the rest of the string, particularly the carbon steel joint immediately above the noble metal bottom joints in the string - the corrosion cells concentrate in that joint. The most promising of these materials was aluminum. However, the corrosion of aluminum yields a corrosion product with a significant increase in volume. This increase has been enough to totally fill the annular space in the liner thus prohibiting further injection of mine water. Carbon steel anodes are now being used for this service. It is questionable how effective they are as there is little difference in the oxidation potential of the anode and the rest of the string. The other limiting factor in the cathodic protection method is the life of the sacrificial anode. When it has been reduced to a corrosion product, it no longer provides protection for the sulfur line.

Bunnell Plastics, Inc., "Heat-Shrinkable Tubing Teflon FEP", Bulletin 205R, (9/30/79), discloses heat-shrinkable tubing composed of TEFLON FEP. The tubing is stated to have a shrinkage of about 20 percent at 230° F.

Bunnell Plastics, Inc., "Installation Instructions For Bunnell Extruded Roll Covers Of FEP Or PFA Teflon", two page bulletin. The bulletin teaches a method of heat-shrinking a tube of Teflon FEP or Teflon PFA onto a roller which is rotated on a lathe. Two opposing heat guns are advanced along the sleeve to heat-shrink it onto the rotating pipe. Some of the problems with this type of system are discussed below.

U.S. Pat. No. 2,963,045 (Canevari et al.) discloses coating a heated pipe with polymer oil, partially curing the polymer oil by the direct action of a flame in the presence of oxygen and applying a layer of asphalt at high temperatures which completely cures the first layer. The two external layers are applied to protect the metal pipe from corrosion.

U.S. Pat. No. 3,610,291 (Heslop et al.) teaches preparing a protective layer for a pipe joint. A tube of a dimensionally heat unstable material, e.g., polyethylene, which has an elastic memory is shrunk onto a tube layer of mastic positioned over the joint.

U.S. Pat. No. 3,877,490 (Tsubouchi et al.) teaches a steel pipe containing a corrosion-resistant plastic layer, an antifusion agent layer thereon and a protective plastic layer thereon. The protective and corrosion-resistant layers are separately extruded on to the other layers of the pipe, respectively.

U.S. Pat. No. 4,091,134 (Uemura et al.) discloses a metal pipe coated with a corrosion-protection layer, which contains polypropylene, styrene-butadiene copolymer, asphalt and a tackifier. The coating is applied by using a heat-melt process. A thermoplastic resin, e.g., polyethylene, can be coated on the first layer by means of extrusion, powdering or tape binding processes.

U.S. Pat. No. 4,199,010 (McGuth et al.) discloses ceramic inner layers for pipe joints. U.S. Pat. No. 4,213,486 (Samour et al.) discloses pipe externally coated with fused powdered epoxy resin which is then wrapped with a polyolefin sheet for corrosion protection.

U.S. Pat. No. 4,245,674 (Nakamura et al.) teaches the use of thermoshrinkable or thermoexpansive tubes made of various rubbers or plastics such as fluorocarbon polymer (see col. 2, lines 24 to 32). The entire inner wall and at least part of the outer wall are covered with one or two peelable protective covers. By a complicated procedure, the inner protective layer is removed in order to get the thermoshrinkable tube over the uncovered joint region of two abutting pipes which contain an outer corrosion proof lining. The thermoshrinkable tube is heat sealed to the pipe joint area.

U.S. Pat. No. 4,287,034 (Pieslak et al.) discloses a method of coating a pipe using certain heat-shrinkable tapes or sheets which are coated on one side with an adhesive.

U.S. Pat. No. 4,312,904 (Meyer) teaches a method of coating a pipe with a hydraulic-setting mass. U.S. Pat. No. 4,371,578 (Thompson) discloses certain heat-shrinkable material for wrapping around a pipe. The mating edges of the material are provided with metal clip elements. U.S. Pat. No. 4,379,009 (Shibata et al.) discloses a method of sealing flange joints of pipes by using certain heat-shrinkable films and a wrapping method.

U.S. Pat. No. 4,386,984 (Jervis) teaches heat-shrinkable end caps for protecting the end of cables. U.S. Pat. No. 4,406,721 (Hoffman) discloses a method of applying heat-shrinkable film to bottles and other articles.

BROAD DESCRIPTION OF THE INVENTION

An object of the invention is to provide an effective, simple and inexpensive process for heat-shrinking material which is heat-shrinkable onto pipes or the like. Another object of the invention is to provide apparatus to carry out the process of the invention. A further object of the invention is to provide the piping produced by the process of the invention. Other objects and advantages are set out herein or are obvious herefrom to one ordinarily skilled in the art.

The advantages and objects of the invention are achieved by the process, apparatus and piping of the invention.

The use in the invention of heat-shrinkable polymeric materials, such as, heat-shrinkable Teflon, has eliminated to a large extent the drawbacks previously associated with the use of Teflon and phenolic resins.

The invention involves a process for the application of a heat-shrinkable material over the exterior surface of a combination of a first pipe connected to a second pipe by means of a connector. The process includes placing a sleeve of a heat-shrinkable polymeric material over the connector, the end portion of the first pipe adjacent to the connector and the end portion of the second pipe adjacent to the connector. The sleeve of the heat-shrinkable polymeric material is heat-shrunk onto the connector, the end portion of the first pipe adjacent to the connector and the end portion of the second portion of the second pipe adjacent to the connector. The heat-shrinkable material must be very resistant to high temperatures and preferably also to chemical activity, depending upon the final use of the coated piping. In sulfur mining operations and in oil field operations, mating pipe ends are referred to as "male" or "pin" ends and "female" or "box" ends.

Preferably the first pipe segment already has a sleeve of a polymeric material which has been heat-shrunk thereon, such prior sleeve not covering the end portion of the first pipe segment adjacent to the connector, the second pipe segment already has a sleeve of a polymeric material which has been heat-shrunk thereon, such prior sleeve not covering the end portion of the second pipe segment adjacent to the connector, and the new sleeve is heat-shrunk over the end portions of the such two prior sleeves. Also preferably the first pipe is externally threaded on the end thereof, the second pipe is externally threaded on the end thereof and the connector is an internally threaded pipe coupling, the threaded end of the first pipe segment and the threaded end of the second pipe segment being threadingly joined with the coupling.

The first pipe, the second pipe and the connector are each preferably externally coated with a baked phenolic resin. Preferably any of the sleeves are composed of a heat-shrunk polyfluoroolefin resin sleeve. Most preferably the sleeve is composed of a heat-shrunk polymer of fluorinated ethylenepropylene or of a heat-shrunk structural derivative of polytetrafluoroethylene containing perfluoroalkoxy side groups.

The problems of corrosion and scaling of metal pipe used for Frasch process sulfur well piping have existed for years. The air lines are one example of sulfur well piping that has experienced corrosion/scaling problems. Depending on well conditions, either corrosion or scaling can be so severe as to perforate the air line piping (corrosion) or deposit a scale thick enough to restrict sulfur flow through the sulfur line. The fitting of the air line (and other pipes) exterior with fluoroplastic tubing, which can be heat-shrunk onto the metal pipe to make an interference fit, will protect the metal pipe from external corrosion and will also provide a low friction surface which retards significant scale deposition. If the fluoroplastic covering is not mechanically damaged, the air line string can last the life of the sulfur well (a highly improbable circumstance in the past) and can also be recovered for additional service. When the air line is removed from the well, the fluoroplastic can be cut at the coupled joints so that the pipe can be disassembled. For further use, a small length of heat-shrinkable fluoroplastic tubing can be applied at the field joints where the original tubing was cut for disassembly and where wrenches may have damaged tubing during reassembly.

The process of the invention is particularly useful for protecting the sulfur line bottom joint. Sleeves of, say, 20 mil thickness of heat-shrinkable Teflon FEP are applied to sulfur line bottom joints. While this sleeve alone solves the downhole problem, preferably it is installed in conjunction with a coating of high temperature baked phenolic resin (e.g., TK-7 of AMF Tubescope) on the pipe and joints. The bottom 3 or 4 joints (3 ½ inch cement-lined Hydril) are usually coated with the baked phenolic resin. The body of the pipe then has the Teflon sleeves heat-shrunk thereon leaving 4 feet, for example, on each end with the phenolic resin coating exposed. After the joints are made up on the rig, another 10 foot section of Teflon sleeve is installed over the joint area and shrunk in place. The joint is thereby protected by two systems on the exterior and by a cement lining on the interior.

The invention also involves a process for the application of a heat-shrinkable material over the exterior surface of a combination of a first pipe connected to a second pipe by means of a connector. The process includes placing a sleeve of a heat-shrinkable polymeric material over a first pipe, which can be capped, so as to leave the lower end of the first pipe uncovered by the sleeve. The sleeve of the heat-shrinkable material is then heat-shrunk onto the first pipe. A second pipe is connected to the free end of the first pipe by a connector or pipe coupling. A sleeve of a heat-shrinkable polymeric material over the second pipe, except for its lower end, the connector, the end portion of the first pipe adjacent to the connector and the end portion of the sleeve of heat-shrinkable polymeric material already heat-shrunk on the first sleeve of the heat-shrinkable polymeric material is heat-shrunk onto the connector, onto the end portion of the first pipe adjacent to the connector, onto the end portion of the heat shrunk sleeve on the first pipe and onto and adjacent to the connector and onto the second pipe. This process embodiment can be used to build up a chain of pipe segments containing a sleeve, each heat-shrunken of the polymeric material, preferably of shrunken Teflon, which has been heat shrunk thereon.

The invention further involves a portable heat chamber for applying a sleeve heat-shrinkable material over the exterior surface of at least one segment of pipe. The portable heat chamber includes a central tube having a diameter sufficient to allow passage therethrough of the sleeve and the pipe segment. The central tube is constructed of a material which can withstand high temperature and which is heat conductive. At least one hollow member circumscribes at least most of the distance around the central tube and is affixed to the central tube. There are at least three gas burning nozzles affixed around and in communication with the circumscribing hollow member. The nozzles are positioned so as to direct the gas flames therefrom onto the outer surface of the central tube. A hollow line is affixed to the hollow member. The hollow line is adapted for connection to a gas source. There are at least three legs affixed to the hollow member.

Preferably there are eight nozzles on the gas ring. Also preferably the nozzles are positioned downwards at an angle of 40 to 60 degrees to the central axis of the central tube. Preferably the portable heat chamber has four legs. Preferably the hollow member is circular in shape, but does not extend completely around the central tube.

The heat chamber of the invention provides an excellent means for applying the heat necessary to shrink the heat-shrinkable polymeric sleeves onto the piping. But any other suitable heating means can be used to heat shrink the heat-shrinkable polymeric sleeves onto the piping. For example, the heat can be supplied by heating elements and controlled by the use of a thermostat.

The invention also includes a combination of piping covered with a layer of heat-shrunk polymeric material. The pipe combination includes a first segment of pipe containing on the outside surface thereof a sleeve of a polymeric material which has been heat-shrunk thereon. The sleeve does not cover one end portion of the first pipe segment. There is a second segment of pipe containing on the outside surface thereof a sleeve of a polymeric material which has been heat-shrunk thereon. The sleeve does not cover one end portion of the second pipe segment. A connector joins the uncovered end of the first pipe segment and the uncovered end of the second pipe segment. There is a sleeve of polymeric material which has been heat-shrunk on the outer surface of the connector, the uncovered portion of the first pipe segment, the end portion of the sleeve thereon, the uncovered portion of the second pipe and the end portion of the sleeve thereon.

Preferably the first pipe segment is externally threaded on the end thereof which is not covered by the sleeve of heat-shrunk polymeric material, the second pipe segment is externally threaded on the end thereof which is not covered by the sleeve of heat-shrinkable polymeric material, and the connector is an internally threaded coupling, the threaded end of the first pipe segment and the threaded end of the second pipe segment being threadingly joined with the coupling.

The first pipe, the second pipe and the connector are each preferably externally coated with a baked phenolic resin. All of the sleeves preferably are composed of a heat-shrunk polyfluoroolefin resin sleeve. Most preferably the sleeves are composed of a heat-shrunk polymer of fluorinated ethylenepropylene or a heat-shrunk structural derivative of polytetrafluoroethylene containing perfluoroalkoxy side groups.

The invention includes a combination of piping covered with a layer of heat-shrunk polymeric material on a chain of at least two pipe segments. The pipe combination includes a first segment of pipe containing on the outside surface thereof a sleeve of a polymeric material which has been heat-shrunk thereon. The sleeve does not cover the lower end portion of the first pipe segment. There is a second segment of pipe containing on the outside surface thereof a sleeve of a polymeric material which has been heat-shrunk thereon. The sleeve does not cover the lower end portion of the second pipe segment. A connector joins the uncovered lower end of the first pipe segment and the upper end of the second pipe segment. The sleeve of polymeric material, which has been heat-shrunk on the second pipe segment, is also heat-shrunk on the outer surface of the connector, on the uncovered portion of the first pipe segment, and on lower end portion of the sleeve on the first pipe segment.

DETAILED DESCRIPTION OF THE INVENTION

Figure 1:
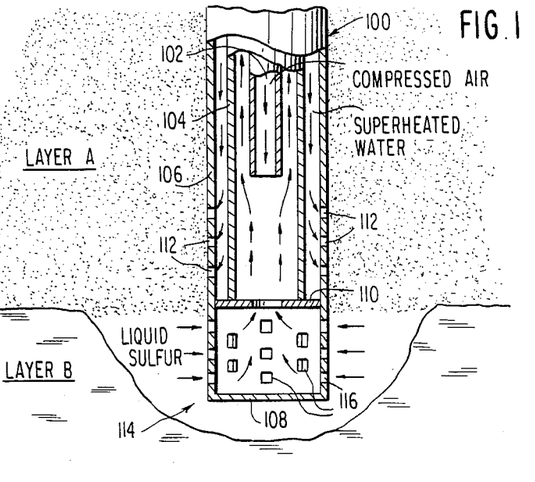
FIG. 1 is a diagram of the lower end of one version of the concentric pipes in a sulfur well.

In FIG. 1, layer A is a layer of sulfur-bearing formation, usually limestone, and layer B is a layer of anhydrite or calcium sulfate. FIG. 1 shows a piping arrangement at the bottom of a Frasch sulfur well. Piping 100 has three concentric pipes 102, 104 and 106. Center pipe 102 is commonly termed "the air line" and middle pipe 104 is commonly termed "the sulfur line". Compressed air comes down air line 102; hot water comes down outer pipe 106; and liquid sulfur is forced up sulfur line 104. Outer pipe 106 is sealed on the bottom by cap 108. Flange 110 seals the bottom of the passageway between outer pipe 106 and sulfur line 104. There is a hole in the center of flange 110 which has a diameter that is less than the internal diameter of sulfur line 104. Sulfur line 104 is shorter in length than outer pipe 106; and air line 102 is shorter in length than sulfur line 104. Small holes 112 are located around the circumference of outer pipe 106 just above flange 110 and within the region of layer A. The superheated water (normally at 310° to 335° F.) passes out holes 112 into (porous) layer A. The elemental sulfur in layer A is melted; and the molten sulfur and the water move down (settle) into cavity 114 in (nonporous) layer B. A small amount of water is mixed with the sulfur settling into cavity 114. The water content of the mixture is usually less than about 1 percent by weight. The molten sulfur moves into piping 100 through holes 116, which are located in outer pipe 106 below flange 110. The sulfur-water mixture in the bottom of piping 100 moves upwards to fill up the bottom spaces. When the sulfur-water level rises to the bottom of air line 102, the compressed air is passed down air line 102. The liquid sulfur and water (froth) are forced (pumped) up the passageway between air line 102 and sulfur line 104 by means of the compressed air exiting from air line 102. This is termed "air-lift". Typically air line 102 has a diameter of ½ to 1¼ inch, sulfur line 104 has a diameter of 2 to 4½ inches and outer pipe 106 has a diameter of 4 to 10 inches.

Figure 2:
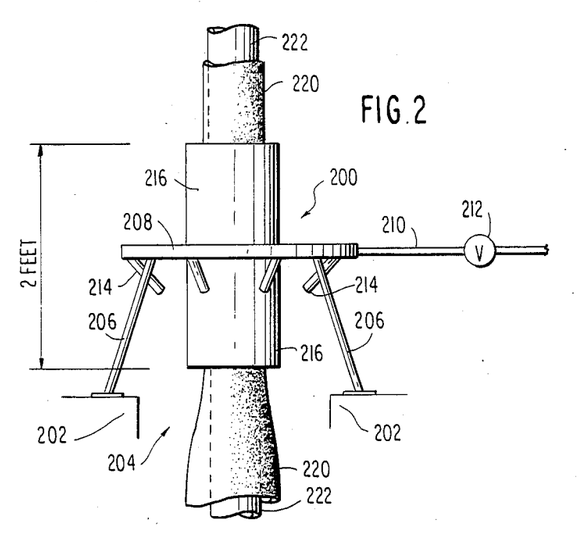
FIG. 2 is a side view of the preferred portable heat chamber of the invention.
Figure 3:
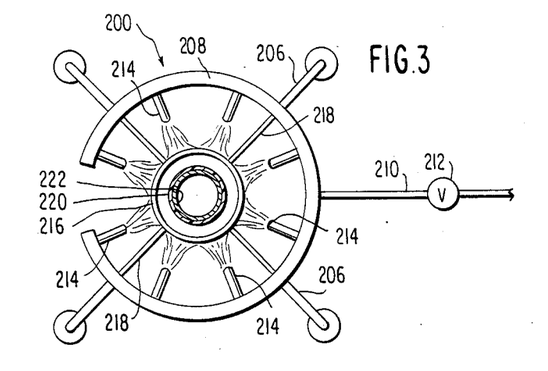
FIG. 3 is a top view of the portable heat chamber of FIG. 2.

In FIG. 2, portable heat chamber 200 is positioned on an elevated surface 202 which has a central vertical passageway 204. Legs 206 of portable heat chamber 200 are planted on flat horizontal portions of elevated surface 202. Legs 206 are affixed to gas pipe ring 208, which in turn is connected to gas feed 210 which is controlled by valve 212. (The gas source is not shown.) Gas is injected into pipe ring 208 (½ inch internal diameter and a ring diameter of 2 feet), and flows to gas nozzles (burners) 214. Flame (as shown in FIG. 3) occurs at the end of nozzles 214. Nozzles 214 (as shown in FIG. 2) are set at an angle towards surface 202 and passageway 204. Gas ring 208 is an interrupted ring (as shown in FIG. 3). Nozzles 214 have a width of 2 inches, have a length of 5 inches and are eight in number, generally spaced around gas ring 208. Preferably eight flame nozzles 214 are used, but the number of flame nozzles 214 can readily be from three to ten or more, keeping in mind that uniformity of heating sleeve 220 and pipe 222 is what is sought. Preferably nozzles 214 are set at an angle of 40 to 60 degrees to the longitudinal axis of vertical casing 216. Nozzles 214 are set at such an angle to make sure that the end of casing 216 is heated to the desired temperature so as to quickly heat shrink heat-shrinkable sleeve 220 to a substantial amount as it is coming into casing 216. This keeps sleeve 220 from being damaged by hitting the end of casing 216. See FIG. 2. Sleeve 220 then completes its heat-shrinking to form a tight fit on pipe segment 222 as it passes through heated casing 216. Casing 216 (7 inch diameter, 2 foot length, 20 pounds) is metal (e.g., steel), is centered in gas ring 208 and is welded to gas ring 208 by means of arms 218.

The internal temperature of casing 216 is raised to about 750° F. by the gas flames. Unshrunk sleeve (tubing) 220 is placed around sulfur pipe line 222, which is slowly raised through heated casing 216 without touching the sides thereof. See FIG. 2. Pipe line 222 and sleeve 220 is raised through casing 216 at, preferably, 1 foot per 10 to 30 seconds. The exact rate at which pipeline 222 and sleeve 220 is raised through casing 216 depends upon the weather conditions, i.e., temperature and wind velocity, since the work is usually performed in a relatively unprotected area, i.e., a drilling rig floor. For the dimensions already given, pipe line 222 generally will have a diameter of 2 to 4½ inches. Pipe line 222 is generally a Hydril sulfur line. Due to the heat radiated or emitted by heated casing 216, sleeve 220 shrinks to tightly fit on pipe line 222. Sleeve 220 is a heat-shrinkable polyfluoroolefin, preferably heat-shrinkable Teflon FEP or Teflon PFA. Pipe line 222 with heat-shrunk sleeve 220 thereon exits out of the top of casing 216. Accordingly, portable heat chamber 200 has effectively and simply been used to apply heat-shrinkable Teflon tubing 220 to sulfur pipe line 222.

Portable heat chamber 200 is easy to transport, set up and use in an industrial manner under field conditions. Elevated surface 202 having central vertical passageway 204 of sufficient width and height to allow pipes 222 and sleeves 200 to be aligned below vertical casing 216 and passed upwards therethrough.

The heat-shrinking can be done using hand-held heat guns or other heating devices. Oven or steam heating is not very satisfactory in trying to heat-shrink the sleeves to obtain an acceptable product. A problem with hand-held heat guns is that by using such devices it is hard to obtain uniform and complete heat-shrinkage of the heat-shrinkable sleeves onto the pipe segment. The problem is somewhat alleviated by the use of two opposing heat guns and by placing the pipe, containing the sleeve therearound, onto a lathe and then heating the sleeve as it rotates. Such a scheme has certain problems. Lathes are not always available in the field. Also, the size of pipe segment which can be treated is limited by the size of any lathe. One could hand rotate very large pipe segments supported on journals, but that is unwieldy. If the journal system is used, the pipe segment sets on the bottom of the sleeve; if the lathe is used, the pipe segment contacts the top of the sleeve. In either instance, it is difficult to initially heat-shrink the end of the sleeve around the end of the pipe segment in a uniform, tight, centered manner using even opposing hand-held heat guns. As the heat guns are moved along the sleeve to heat-shrink it, the remaining portion of the sleeve may still be located off center. The heat guns can be mounted on a carriage for holding and advancing the heat guns along the sleeve and pipe segment mounted on the lathe.

If heat-shrinking is to be used by means of heat guns, preferably hot air guns, capable of delivering air temperatures from 500° to 750° F., are used. It may be desirable to partially close the inlet air control on the guns to reduce air flow. To insure a smooth, uniform covering without wrinkles, the use of two high-volume, high-capacity, heavy-duty guns is recommended (particularly for pipe diameters of about 3½ inches). The two guns are used on opposite sides of the pipe opposing each other with one slightly ahead of the other. Small diameter pipes can be applied with one gun, but extreme care must be taken to prevent wrinkles and to heat the cover sufficiently to get the desired grip on the pipe. During shrinkage, heat must be applied evenly around the circumference to insure a finished surface free of wrinkles or bubbles. To insure even heating when localized heat sources are used such as hot air guns, some method is required for rotating the pipe at a fairly uniform speed. A speed of from 10 to 30 revolutions per minute is adequate. Rotational forces applied through the unshrunk sleeve to the pipe may tend to cause twists and wrinkles. Many of the techniques for heat guns are applicable to the portable heat chamber of the invention.

The sleeve should be longer than the area of the pipe to be covered because the sleeve may change length slightly during installation. For example, allow about three inches extra for 100 inches in length of desired sleeve coverage for the shortening of Teflon FEP or Teflon PFA during heat-shrinking.

When using hand-held heat guns, begin shrinkage by pointing the guns (or gun) at the pipe about 2 inches from the starting end. The gun muzzles should be held two to three inches away from the work and should be pointed slightly towards the pipe end. Heat this area until the sleeve shrinks down smoothly onto the pipe. As the sleeve shrinks tightly, the guns should be brought closer to the work and positioned about one inch away. Shrink the sleeve which extends beyond the roll face shoulder to its smallest diameter. The end of the sleeve is now attached and the unshrunk portion should stand out at a relatively uniform distance from the pipe surface. At this point, stop the rotation of the pipe and line up the sleeve along its length. It should be straight with a minimum of twist. Resume rotation and position the gun muzzles about one inch from the sleeve. Move the heat guns slowly and symmetrically along the pipe towards the unshrunk end. The guns should always point toward the starting end with the angle between the pipe axis and each gun muzzle from 60° to 75°. Never aim the guns at the unshrunk sleeve area ahead. The muzzle should point about ½ inch behind the transition slope between the shrunk and unshrunk sleeve.

When heat guns are used, the heat source should be advanced slowly to heat the sleeve and the pipe to insure a good shrink-fit. The exact traversing speed is difficult to predict as it is influenced by the heat capacity of the pipe, its diameter, and the amount of shrinkage required. As a starting point, a traversing speed of about 1 inch per minute is suggested. When a speed which seems to be acceptable is found, slow down a little more. Under no circumstances should two areas of the sleeve be shrunk so that there is an unshrunk portion between them. If the cover lengthens as it shrinks, one end must be free or wrinkles and bubbles may result. If a wrinkle or other surface distortion develops during the shrinking process, stop the forward movement of the heat source and avoid heating the problem area directly. Move back down the pipe a little and approach the problem area slowly.

The surface of the pipe to be covered should be smooth, clean, and dry. The pipe need not be machined or ground, but foreign materials such as oil, grease, dirt, loose scale, product build-up, etc., must be removed. In particular, the pipe surface must be moisture free. The pipe preferably is at (or slightly above) room temperature before the sleeve is installed, but this is difficult to achieve in the field and is not necessary. A warm pipe (about 100° F.) can be sleeved faster.

Figure 4:
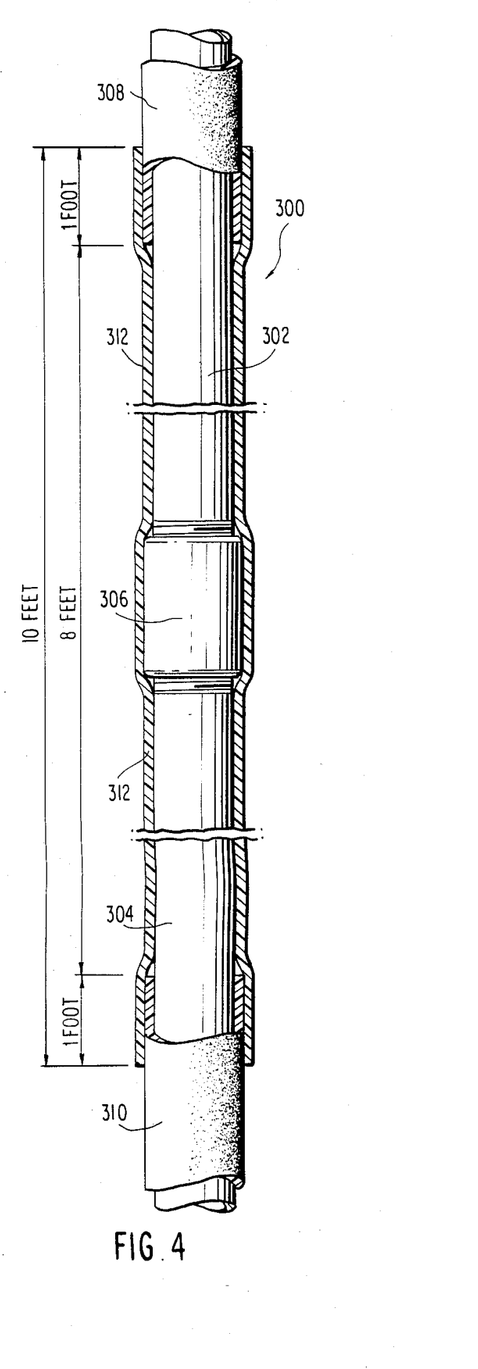
FIG. 4 is a partially cut-away view of a pipe combination of the invention.

Pipe combination 300 of the invention is shown in FIG. 4, and is prepared using portable heat chamber 200 shown in FIGS. 2 and 3. Pipes 302 and 304 are each a 3½ inch Hydril cement-lined sulfur pipe line which is externally coated with a high-temperature baked phenolic resin (e.g., TK-7 of AMF Tubescope). The threaded ends of pipes 302 and 304 are threadingly joined by pipe coupling 306. Pipe coupling 306 is internally lined with cement, is externally coated with a baked phenolic resin (e.g., TK-7). Pipes 302 and 304 contain thereon heat-shrunk Teflon FEP sleeves 308 and 310, respectively. Teflon FEP is a heat-shrinkable polymeric material. Sleeves 308 and 310 were installed (heat-shrunk) on pipes 302 and 304, respectively, before pipes 302 and 304 were sent to a site of usage, namely, a sulfur well drilling rig. The distance from the end of sleeve 308 to the end of sleeve 310 is 8 feet. Sleeve 312 has an internal diameter to slip it into place over pipes 302 and 304 (including heat-shrunk sleeves 308 and 310) and coupling 306 before it is heat-shrunk. Sleeve 312 has a length of 10 feet so that it extends one foot onto the end of sleeve 308 and extends one foot onto the end of sleeve 310. Sleeve 312 is shown in its heat-shrunk state over coupling 306, the uncovered end portion of pipe segment 302, the end portion of sleeve 308, the uncovered end portion of pipe segment 304 and the end portion of sleeve 310. Heat-shrunk sleeve 312 covers any damage to the baked phenolic coating on coupling 306 which occurs, while pipe combination 300 is being made up (i.e., coupling 306 being used to join together pipes 302 and 304), and insures the integrity of sleeves 308 and 310 by overlapping the facing ends thereof. Sleeve 312 is a sleeve of heat-shrunk Teflon FEP. Pipe combination 300 is a sulfur line bottom joint.

Sleeves 308, 310 and 312 can also preferably be composed of Teflon PFA.

Two or more sleeves of heat-shrinkable material can be applied over the same piping or region thereof.

The heat-shrinkable material is normally a heat-shrinkable polymeric material. The heat-shrinkable polymeric material must be chemical and heat resistant. The heat-shrinkable material is preferably a heat-shrinkable polyfluoroolefin resin, and the preferred heat-shrinkable polyfluoroolefin resin is PFA resin or FEP resin. The polyfluoroolefin resins have very excellent resistance to chemicals and heat. FEP resin is a polymer of fluorinated ethylenepropylene and is also known as HFP propylene and Teflon FEP. (Teflon is a registered trademark of E.I. duPont de Nemours & Co., Inc.) PFA resin is a structural derivative of polytetrafluoroethylene (TFE resin or Teflon TFE) containing perfluoroalkoxy side groups. One of the reasons that PFA resin is a most preferred heat-shrinkable material in the process of the invention is that it can be processed by conventional molding and extrusion methods in preparing it in tube or sleeve form.

Heat-shrinkable tubing composed of fluorinated ethylenepropylene (FEP resin or TEFLON FEP) is commercially available in the following sizes:

TABLE

| Tube Nom. Diameter Inches 1 | Minimum Internal Diameter Before Shrinking, Inches | Internal Diameter Will Shrink To At Least, Inches |
|---|---|---|
| 1¼ | 1.3 | 1.0 |
| 1½ | 1.7 | 1.3 |
| 2 | 2.1 | 1.7 |
| 2½ | 2.6 | 2.1 |
| 3 | 3.1 | 2.6 |
| 3½ | 3.6 | 3.1 |
| 4 | 4.2 | 3.6 |
| 5 | 5.2 | 4.2 |
| 6 | 6.2 | 5.2 |
| 7 | 7.2 | 6.2 |
| 8 | 8.2 | 7.2 |
| 9 | 9.2 | 8.2 |
| 10½ | 10.7 | 9.2 |
| 12 | 12.2 | 10.7 |

Note:
1 The tubes above each have a wall thickness of 0.020 inch, however, other wall thicknesses can be used.

The above commercially-available heat-shrinkable TEFLON FEP tubing has a shrinkage of approximately 20 percent at a shrink temperature of 230° F., has a use temperature of up to 400° F. or so, and has a tensile strength of 3,000 to 4,000 psi.

The heat-shrinking is achieved at a temperature which causes the heat-shrinkable polymeric material to tightly shrink onto the pipe and/or joint without damaging the heat-shrinkable material. The preferred temperature for heat-shrinking a sleeve of FEP resin is 230° F.

The heat-shrinkable Teflon sleeves can be installed on a length of sulfur well pipe line by any suitable method or using any suitable means. Installation over lengths of sulfur well airline are similar. Application of heat to cause the Teflon to heat-shrink can be done by hot air guns or similar devices, but preferably the portable heat chamber of the invention is used.

When dealing with piping for Frasch process sulfur wells, preferably the piping is coated with baked phenolic resin prior to application of the heat-shrinkable Teflon or other heat-shrinkable polyfluoroolefins. The phenolic resin coating application is not mandatory but it does provide substantially improved corrosion protection.

Full scale tests of the invention process and apparatus have shown the piping over which the polyfluoroolefin sleeves are shrunk must be free of water. Otherwise, the trapped water when heated to sulfur well temperature conditions will flash to steam and perforate the polyfluoroolefin tubing. Care has to be taken when lowering polyfluoroolefin covered piping in directionally drilled wells, otherwise the polyfluoroolefin coating may be damaged as it is dragged along the inclined well casing.

The following is a disclosure of a preferred method for preparing and installing the improved coating design of the tubing or piping used in sulfur wells:

(a) Joints of tubing are coated with a baked phenolic resin coating. Due to the practical limitation of oven size, the joints normally will not exceed 30 feet in length.

(b) The joints are covered with a protective wrapping of burlap (or other suitable packaging material). The material is left on the joints until the tubing arrives at the rig.

(c) Prior to usage, the wrapping is removed and heat-shrinkable Teflon is installed over the body of each joint. The Teflon FEP coating stops at least 2 feet from the pin end and 4 feet from the box end to avoid damage to the Teflon sleeve during "make-up" procedures. This installation of Teflon on the body of the pipe is done prior to installation to expedite the process on the rig. The Teflon sleeve is sometimes provided in length too short to cover the entire length of tubing—when this occurs, a splice must be made. The splice is made by first installing a piece of Teflon sleeve on the pipe starting at the box end. This piece is shrunk into place, then the next piece of Teflon sleeve is installed overlapping the first sleeve by at least 2 feet. In this manner the exposed edge is always "facing up" in the well during installation. This reduces the chance of the sleeve peeling back as the pipe is lowered into the well.

(d) On the first joint to be put into the well, a piece of Teflon sleeve two feet one inch longer than the exposed pipe is placed on the pin end. This piece is installed with one inch extending past the end of the pipe. Heat-shrink the sleeve into place. The joint is then lowered into the well. When setting the rotary pipe slips, the slip inserts must be placed above the Teflon sleeve. The next joint is then picked up and a Teflon sleeve is slid up onto the joint. This piece is secured with a piece of soft cord or rope high enough to keep it out of the way while making up the joints. The second joint is then screwed into the first. The tong dies are then checked to assure that they are clean and sharp, and are then used to make up the connection to the specified torque.

(e) After the joints are made up, the assembly is picked up, the slips are removed and the Teflon sleeve is untied. The Teflon sleeve is then allowed to slide down overlapping both the Teflon sleeves on the joints by at least two feet. The sleeve is then heat-shrunk into place. This will effectively cover any damage to the phenolic resin coating which occurred during make-up.

(f) The process is repeated until the desired length of tubing has been coated. This double coating has the advantage that a "back-up" coating system is present. If the phenolic resin coating fails, or has faults, it is protected by the Teflon sleeve. If the Teflon exterior is scrapped or scratched during installation, the phenolic resin coating is still present to provide protection.

Figure 5:
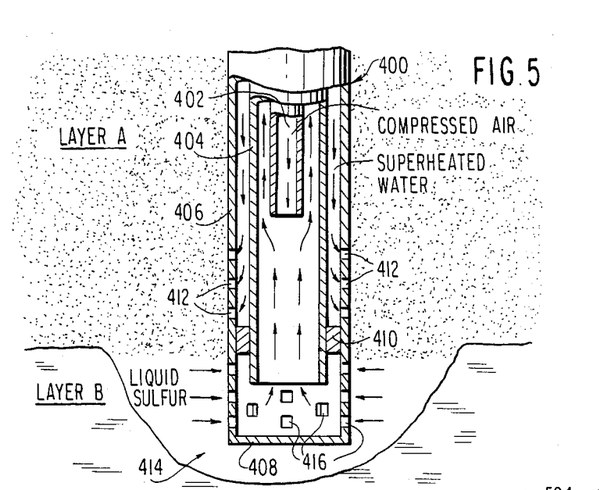
FIG. 5 is a diagram of the lower end of another version of the concentric pipes in a sulfur well.

In FIG. 5, layer A is a layer of sulfur-bearing formation, usually limestone, and layer B is a layer of anhydrite or calcium sulfate. FIG. 5 shows another piping arrangement at the bottom of a Frasch sulfur well. Piping 400 has three concentric pipes 402, 404 and 406. Center pipe 402 is commonly termed "the air line" and middle pipe 404, is commonly termed "the sulfur line". Compressed air comes down air line 402; hot water comes down outer pipe 406; and liquid sulfur is forced up sulfur line 404. Outer pipe 406 is sealed on the bottom by cap 408. Annular plug 410 seals the passageway between outer pipe 406 and sulfur line 404 near its bottom below small holes 412 in outer pipe 406. Sulfur line 404 is shorter in length than outer pipe 406; and air line 402 is shorter in length than sulfur line 404. Small holes 412 are located around the circumference of outer pipe 406 just above plug 404 and within the region of layer A. The superheated water (normally at 310° to 335° F.) passes out holes 412 into (porous) layer A. The elemental sulfur in layer A is melted; and the molten sulfur moves down (settle) into cavity 414 in (nonporous) layer B. A small amount of water is mixed with the sulfur settling into cavity 414. The water content of the mixture is usually less than about 1 percent by weight. The molten sulfur and the water move into piping 400 through holes 416, which are located in outer pipe 406 below flange 410. The sulfur-water in the bottom of piping 400 moves upwards to fill up the bottom spaces. When the sulfur-water level rises to the bottom of air lines 402, the compressed air is passed down air line 402. The liquid sulfur and water (froth) are forced (pumped) up the passageway between air line 402 and sulfur line 404 by means of the compressed air exiting from air line 402. This is termed "air-lift". Typically air line 402 has a diameter of $\frac{1}{2}$ to $1\frac{1}{4}$ inch, sulfur line 404 has a diameter of 2 to $4\frac{1}{2}$ inches and outer pipe 406 has a diameter of 4 to 10 inches.

The uses of the invention are not limited to downhole sulfur well piping. The corrosion protection offered by the invention is also applicable to downhole piping in other uses, in particular, the following:

1. Frasch sulfur mining "bleedwells". These are wells which remove excess water from the underground formations in which Frasch sulfur mining operations are being performed. This prevents excessive pressure buildup within the formation as the hot water is injected as previously described. The piping of these wells are exposed to the same corrosive environment as sulfur producing wells.

2. Chemical Plant Disposal Wells. The exterior surfaces of the piping of these wells are exposed to normal downhole corrosive conditions and the lower exterior surfaces may be exposed to corrosive waste chemicals which are being disposed of. A failure of the downhole piping might allow the release of undesirable chemicals to or near the surface.

3. Oil Field Waterflood Operations. The exterior surfaces of the piping of wells used in this surface would be exposed to normal downhole corrosive conditions and, additionally, the lower exterior piping surface would be exposed to corrosive conditions created by the waterflood.

Figures 6, 8:
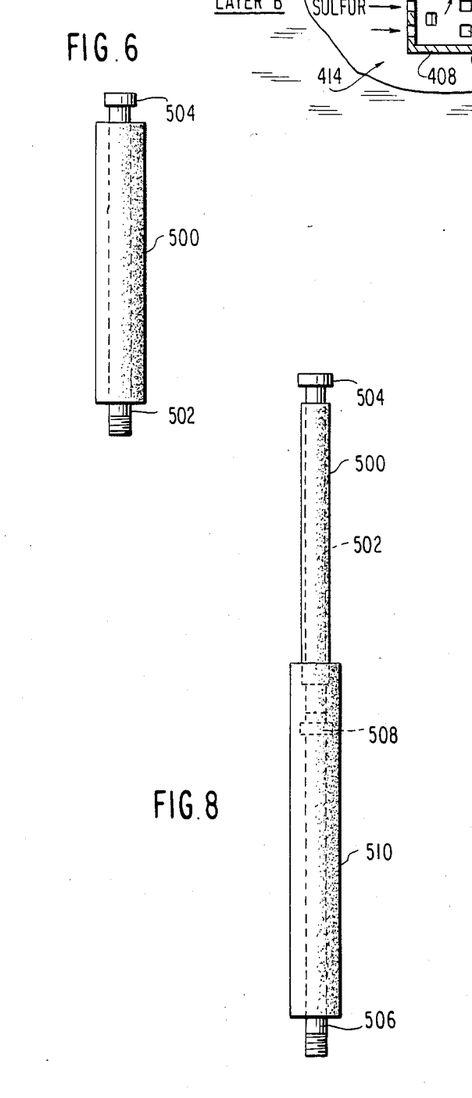
FIG. 6 is a side view of one step in a preferred method of the invention of preparing a pipe string having a heat-shrinkable sleeve heat-shrunk thereon.
FIG. 8 is a side view of the initial step of adding a pipe segment in the process of FIG. 6.
Figure 7:
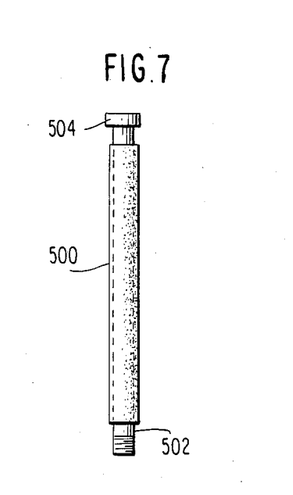
FIG. 7 is a side view of the second step of the process of FIG. 6.
Figure 9:
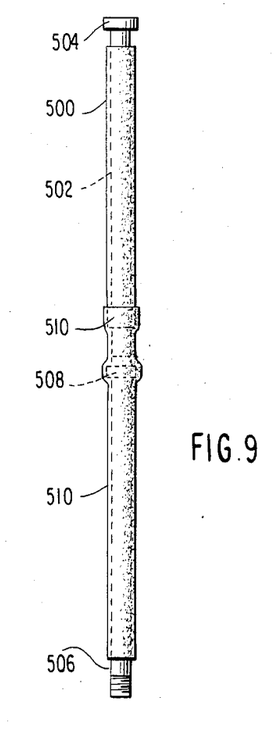
FIG. 9 is a side view of the heat-shrinkable material heat-shrunk onto the second pipe segment in conjunction with the process of FIG. 6.

Another advantageous method of placing the heat-shrinkable polymeric material over the pipe line, including pipe joints between the segments of pipe, is shown in FIGS. 6 to 9. In FIG. 6, unshrunk heat-shrinkable Teflon sleeve 500 is placed over pipe section 502. Pipe section 502 is capped on its upper end with cap 504. Unshrunk heat-shrinkable Teflon sleeve 500 can be shrunk onto pipe section 502 using any suitable heating means, such as, portable heating chamber 200 shown in FIG. 2 or by means of one or more portable heat guns as described above. FIG. 7 shows pipe segment 502 with Teflon sleeve 500 heat shrunk thereon. Referring to FIG. 8, pipe segment 502 is then connected to pipe segment 506 by means of pipe coupling 508. Then unshrunk heat-shrinkable Teflon sleeve 501 is placed over the second pipe segment, namely, pipe segment 506, over pipe coupling 508, over the uncovered lower end of pipe segment 502, and over about 6 inches to 1 foot of the lower end of Teflon sleeve 500 shrunk on pipe segment 502. This is illustrated in FIG. 8. At that point, unshrunk Teflon sleeve 510 is heat-shrunk onto pipe segment 506, joint 508 and the lower portions of shrunk Teflon sleeve 502 and pipe joint 500. The heat-shrinking can be done by using portable heat chamber 200, heat guns or any other suitable source of heat. FIG. 9 shows the two pipe segments after the second Teflon sleeve 510 has been heat-shrunk onto the pipe string. The above is illustrative of how a pipe string composed an unlimited number of pipe joints can be prepared having a shrunken sleeve thereon (of heat-shrinkable polymeric material) within the scope of this invention.

What is claim is:

1. Process for the application of a heat-shrinkable materal over the exterior surface of a combination of a first pipe connected to a second pipe by means of a connector for use in hot sulfur wells, comprising:
    (a) placing a sleeve of a heat-shrinkable polymeric material over the connector and the end portion of the second pipe adjacent to the connector; and
    (b) heat-shrinking the sleeve of the heat-shrinkable polymeric material onto the connector, the end portion of the first pipe adjacent to the connector and the end portion of the second portion of the second pipe adjacent to the connector, said heat-shrinkable polymeric material being polyfluoroolefin resin and being resistant to molten sulfur at a temperature of about 335° F.

2. Process as claimed in claim 1 wherein the first pipe segment already having a sleeve of a polymeric material which has been heat-shrunk thereon, such prior sleeve not covering the end portion of the first pipe segment adjacent to the connector, the second pipe segment already having a sleeve of a polymeric material which has been heat-shrunk thereon, such prior sleeve not covering the end portion of the second pipe segment adjacent to the connector, and sleeve (b) is heat-shrunk over the end portions of the such two prior sleeves.

3. Process as claimed in claim 2 wherein the first pipe is externally threaded on the end thereof, the second pipe is externally threaded on the end thereof and the connector is an internally threaded pipe coupling, the threaded end of the first pipe segment and the threaded end of the second pipe segment being threadingly joined with the coupling.

4. Process as claimed in claim 2 wherein the first pipe, the second pipe and the connector are each externally coated with a bake phenolic resin.

5. Process as claimed in claim 1 wherein the heat-shrinkable polymeric material is about a 20 mil thickness.

6. Process as claimed in claim 4 wherein the heat-shrunk polyfluoroolefin resin sleeve is a sleeve of a heat-shrunk polymer of fluorinated ethylenepropylene.

7. Process as claimed in claim 4 wherein the heat-shrunk polyfluoroolefin resin sleeve is a sleeve of a heat-shrunk structural derivative of polytetrafluoroethylene containing perfluoroalkoxy side groups.

8. Process for the application of a heat-shrinkable material over the exterior surface of a combination of a first sulfur-line pipe connected to a second sulfur-line pipe by means of a connector, said first and second sulfur-line pipes being adapted for use as part of the sulfur line of a Frasch process sulfur well piping arrangement, comprising:
    (a) placing a sleeve of a heat-shrinkable polymeric material over the connector, the end portion of the first sulfur-line pipe adjacent to the connector and the end portion of the second sulfur-line pipe adjacent to the connector; and (b) heat-shrinking the sleeve of the heat-shrinkable polymeric material onto the connector, the end portion of the first sulfur-line pipe adjacent to the connector and the end portion of the second portion of the second sulfur-line pipe adjacent to the connector, said heat-shrinkable polymeric material being polyfluoroolefin resin and being resistant to molten sulfur at a temperature of about 335° F.

9. Process for the application of a heat-shrinkable material over the exterior surface of a combination of a first pipe connected to a second pipe by means of a connector for use in a hot sulfur well, comprising:
   (a) placing a first sleeve of a heat-shrinkable polymeric material over all but one end portion of the first oipe.
   (b) heat-shrinking the sleeve of the heat-shrinkable polymeric material onto the first pipe;
   (c) connecting said end portion of the first pipe to and end portion of the second pipe using a line connector;
   (d) placing a second sleeve of a heat-shrinkable polymeric material over the connector, the end portion of the first pipe adjacent to the connector, the end portion of the heat-shrunk first sleeve adjacent to the connector and the end portion of the second pipe adjacent to the connector: and
   (e) heat-shrinking the second sleeve of the heat-shrinkable polymeric material onto the connector, the end portion of the first pipe adjacent to the connector, the end portion of the heat-shrunk first sleeve adjacent to the connector, and the end portion of the second portion of the second pipe adjacent to the connector, said heat-shrinkable polymeric material being polyfluoroolefin resin and being resistant to molten sulfur at a temperature of about 335° F.

10. Process as claimed in claim 9 wherein the first pipe is externally threaded on the end thereof, the second pipe is externally threaded on the end thereof and the connector is an internally threaded pipe coupling, the threaded end of the first pipe segment and the threaded end of the second pipe segment being threadingly joined with the coupling.

11. Process as claimed in claim 10 wherein the first pipe, the second pipe and the connector are each externally coated with a baked phenolic resin or other suitable coating.

12. Process as claimed in claim 9 wherein said first sleeve and said second sleeve are each composed of a heat-shrunk polyfluoroolefin resin sleeve.

13. Process as claimed in claim 12 wherein the heat-shrunk polyfluoroolefin resin sleeve is a sleeve of a heat-shrunk polymer of fluorinated ethylenepropylene.

14. Process as claimed in claim 12 wherein the heat-shrunk polyfluoroolefin resin sleeve is a sleeve of a heat-shrunk structural derivative of polytetrafluoroethylene containing perfluoroalkoxy side groups.

15. Process for the application of a heat-shrinkable material over the exterior surface of a combination of a first sulfur-line pipe connected to a second sulfur-line pipe by means of a connector, said first and second sulfur-line pipes being adapted for use as part of the sulfur line of a Frasch process sulfur well piping arrangement, comprising:
   (a) placing a first sleeve of a heat-shrinkable polymeric material over all but one end portion of the first sulfur-line pipe;
   (b) heat-shrinking the sleeve of the heat-shrinkable polymeric material onto the first sulfur-line pipe;
   (c) connecting said end portion of the first sulfur-line pipe to an end portion of the second sulfur-line pipe using a pipe connector;
   (d) placing a second sleeve of a heat-shrinkable polymeric material over the connector, the end portion of the first sulfur-line pipe adjacent to the connector, the end portion of the heat-shrunk first sleeve adjacent to the connector, and the end portion of the second sulfur-line pipe adjacent to the connector; and
   (e) heat-shrinking the second sleeve of the heat-shrinkable polymeric material onto the connector, the end portion of the first sulfur-line pipe adjacent to the connector, the end portion of the heat-shrunk first sleeve adjacent to the connector, and the end portion of the second portion of the second sulfur-line pipe adjacent to the connector, said heat-shrinkable polymeric material being polyfluoroolefin resin and being resistant to molten sulfur at a temperature of about 335° F.

* * * * *